United States Patent [19]

Blevins et al.

[11] 4,331,953

[45] May 25, 1982

[54] COMMUNICATION SYSTEM FOR USE IN HAZARDOUS CONFINED AREAS

[75] Inventors: Gerald G. Blevins, Edmonds; Fred S. Fairbank, Everett; Wayne E. Hixson, Seattle; Reginald F. Knowlton, Everett, all of Wash.

[73] Assignee: The Boeing Company, Seattle, Wash.

[21] Appl. No.: 106,871

[22] Filed: Dec. 26, 1979

[51] Int. Cl.[3] .......................... G08B 1/08; H04Q 7/00

[52] U.S. Cl. .................................... 340/539; 340/306; 340/309.1; 340/309.3; 340/573; 340/825.69

[58] Field of Search ............... 340/539, 573, 306, 304, 340/307, 309.1, 309.2, 309.3, 309.4, 309.5, 309.6, 311, 694–696, 520, 322; 455/53, 54, 67, 68, 70, 352, 228

[56] References Cited

U.S. PATENT DOCUMENTS

| | | | |
|---|---|---|---|
| 2,520,007 | 8/1950 | Hochgraf | 340/306 |
| 3,104,386 | 9/1963 | Klein | 340/309.1 |
| 3,588,858 | 6/1971 | Demuth | 340/539 |
| 3,795,896 | 3/1974 | Isaacs | 340/539 |
| 4,012,732 | 3/1977 | Herrick | 340/573 |
| 4,103,235 | 7/1978 | Bryant | 455/228 |
| 4,157,540 | 6/1979 | Oros | 340/539 |

*Primary Examiner*—John W. Caldwell, Sr.
*Assistant Examiner*—Donnie L. Crosland
*Attorney, Agent, or Firm*—Christensen, O'Connor, Johnson & Kindness

[57] ABSTRACT

A communications system for use by workers in a confined hazardous working location includes a transmitter that is carried by the worker in the hazardous area. The transmitter is capable of sending either an alarm signal or a check-in signal to a centrally located monitoring and control station. The monitoring and control station includes a receiver for receiving the signal from the transmitter and further includes an alarm that is activated upon receipt of an alarm signal from the transmitter. The receiving unit further includes a timer that automatically activates an alarm signal upon the expiration of a predetermined amount of time. The timer in the receiver is initialized by receipt of a check-in signal from the transmitter. The transmitter includes a warning subsystem that alerts the worker of the impending expiration of time on the receiver timer to permit the worker to check in and reinitialize the receiver timer, thereby eliminating false alarms.

11 Claims, 5 Drawing Figures

Fig. 3.
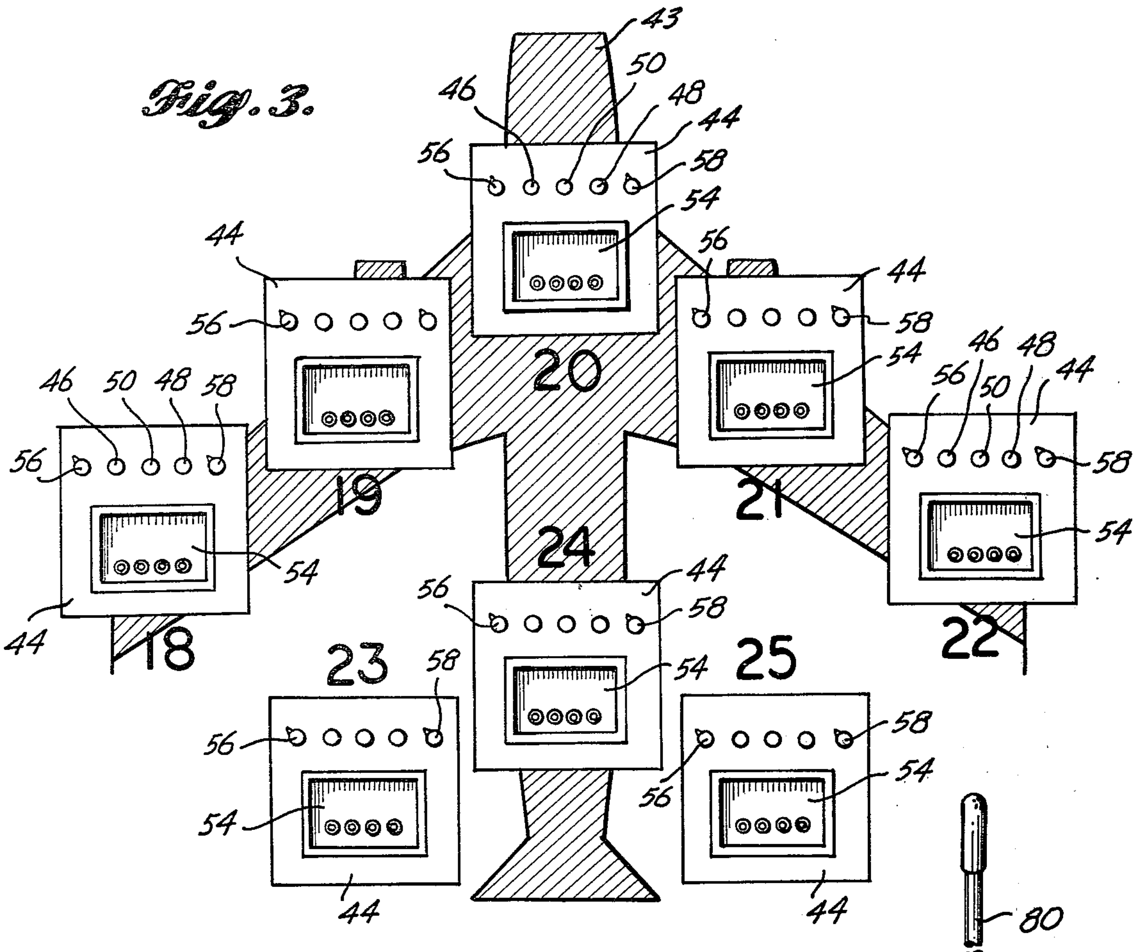
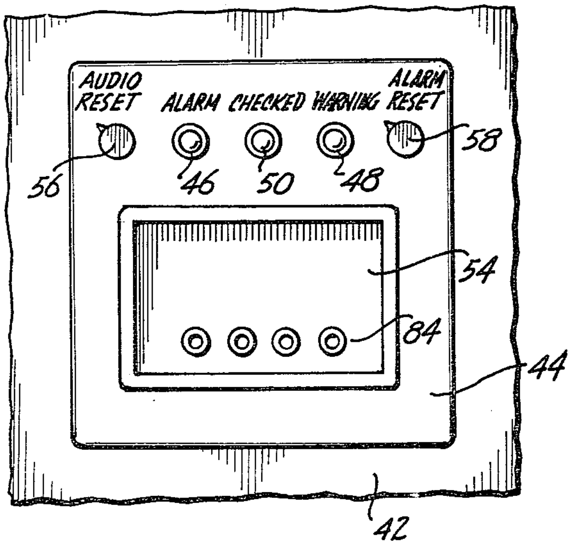
Fig. 4.
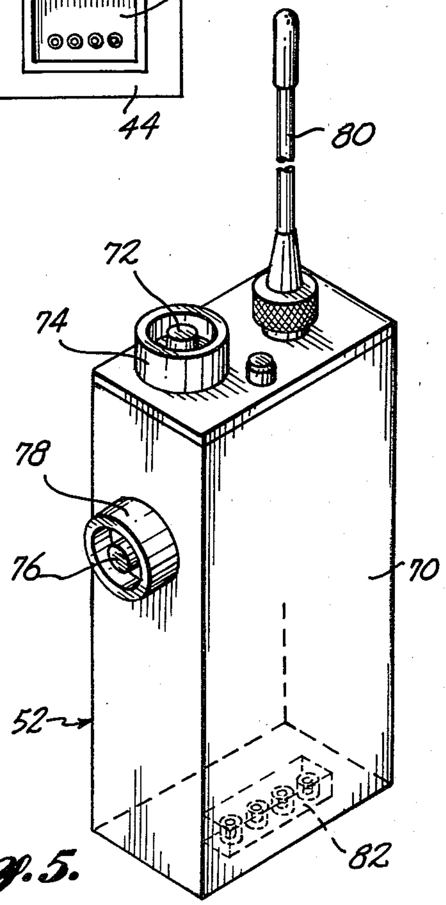
Fig. 5.

COMMUNICATION SYSTEM FOR USE IN HAZARDOUS CONFINED AREAS

BACKGROUND OF THE INVENTION

This invention relates to communications systems and more particularly relates to a communication system for use in hazardous confined areas.

There exist several situations in which a worker must enter a confined space in order to perform some work. One example of such a work situation is in the airplane industry, where workers must climb inside the fuel tanks located in the wings of an aircraft in order to clean and seal the inside of the fuel tanks before they are filled with fuel. Generally, the solvents which are used in cleaning these fuel tanks give off fumes which are toxic in varying degrees.

State and federal governments are enacting strict safety codes dealing with work in hazardous areas in order to protect workers from potential or actual dangers. For example, a typical regulation dealing with a situation such as the hazardous job of cleaning out aircraft fuel tanks calls for a lifeline to be attached to the worker who is inside the fuel tank. The lifeline is then run outside the confined space and a second worker is assigned to tend the lifeline so that in case of trouble the second worker can pull the first worker out of the hazardous situation by means of the lifeline.

A system involving lifelines and tenders requires that an extra person be placed on the job and results in a sharp increase in costs and inefficient use of personnel. It is desirable, therefore, to provide some other means for keeping in touch with a worker in a hazardous work area that does not involve such inefficient and costly measures.

Several systems have been devised in the prior art for dealing with such situations. One such system is shown in U.S. Pat. No. 3,588,858 to Demuth. In the Demuth system, a safety alarm system becomes activated when the body of a worker assumes a position other than a normal working position. The activation is provided by means of a position-sensitive switch attached to a radio transmitter which broadcasts a signal depending upon the position of the person wearing the transmitter. For example, so long as the worker is standing upright, no alarm is transmitted, however, should something happen to cause the worker to lose consciousness and fall, the change in position of the worker to a substantially horizontal position would cause the position-sensitive switch to activate the transmitter and send an alarm which in turn would be monitored by other personnel who could send help to the scene. There are certain disadvantages to use of a position-sensitive switch activated transmitter. The most significant one is that such a system will not work in an area where the normal working position cannot be predicted. For example, during the operation of cleaning an aircraft fuel tank mentioned above, the worker may be in a standing position at one point, crouching at another, sitting, and possibly even kneeling or lying down during his efforts in cleaning the inside of the tank. Therefore a position-sensitive switch would not work since the worker could be in several different positions and still not be in any danger.

Systems have also been devised using vapor-sensitive switches which activate an alarm transmitter when the buildup of vapors within the space reaches a certain level. The problem with a system based on vapor concentration is that there are several different kinds of solvents and several different kinds of vapors used with varying degrees of toxicity and varying allowable concentrations so that the vapor sensing range of the switch would have to be adjusted each time a different solvent was used and possibly even between operations if one solvent was used initially and then a second solvent was used for a second cleaning, for example.

It is also possible to monitor the vital signs of the worker such as breathing rate, heart rate, blood pressure, pulse, however, the systems which are capable of monitoring vital signs are expensive and generally the probes which are attached to the worker to make such measurements are complicated and difficult to attach.

It is therefore an object of the present invention to provide a communication system that can be used by workers in hazardous areas to both automatically monitor their well-being during their exposure in the hazardous area and also to allow them to summon assistance from the outside if need be.

It is a further object of this invention to provide such a communication system in which an alarm is automatically activated after a certain period of time has elapsed if the worker has not checked in with a command station prior to the lapsing of that time.

It is a further object of this invention to provide such a communication system in which the worker is alerted of the pending expiration of the check-in time period to prevent false alarms from being sent.

It is another object of this invention to provide such a communication system which can be utilized in connection with several workers in several locations simultaneously.

It is another object of this invention to provide such a communications system that is relatively inexpensive to manufacture and operate and simple for the worker to use.

SUMMARY OF THE INVENTION

In accordance with the above-stated objects, a communications system for use in a confined hazardous area is disclosed including a transmitter that is capable of selectively transmitting either a first signal or a second signal to a receiving means. The receiving means produces a first alarm signal in response to reception of the first signal and produces an initialization signal in response to the reception of the second signal. A first timer means is coupled to the receiver means and is initialized by the initialization signal from the receiver means. The first timer means is adapted to produce a time out signal upon expiration of a predetermined period of time after initialization. An alarm means is coupled to the first timer means and the receiver means. The alarm means preferably produces both an audible and visible alarm in response to either the time out signal or the first alarm signal.

Preferably, the communication system also includes a manually actuatable reset means that selectively produces either a reset signal or a silence signal. The manually actuatable reset means is coupled to the alarm means and reception by the alarm means of the reset signal terminates the audible and visible alarms whereas reception by the alarm means of the silence signal terminates the audible alarm while maintaining the visible alarm.

Further, the communication system preferably includes a second timer means associated with the transmitter. The second timer acts as a reminder to the worker carrying the transmitter to transmit the second signal to initialize the first timer means. The second timer is initialized by transmission of the second signal by the transmitter. Upon expiration of a predetermined time after initialization, the second timer activates a buzzer also associated with the transmitter to alert the worker that it is time to activate the transmitter for transmission of the second signal.

BRIEF DESCRIPTION OF THE DRAWINGS

The principles and the above-mentioned advantages and objects of the present invention will be better understood by those of ordinary skill in the art and others upon a reading of the ensuing specification in conjunction with the accompanying drawings wherein:

FIG. 3 is a plan view of a monitoring panel suitable for use with the communications system of the present invention.

FIG. 4 is a detail of the plan view of FIG. 2 showing the monitoring panel section for a single transmitter.

FIG. 5 is an isometric view of a transmitter made in accordance with the principles of the present invention for use in the communications system of the present invention.

DETAILED DESCRIPTION OF THE PREFERRED EMBODIMENT

In accordance with the above-stated principles and objects, a communications system suitable for use in a confined hazardous area in order to account for the safety and well-being of workers within that hazardous area will be described with particular reference to the use of the system in conjunction with the construction and maintenance of an aircraft. Although the system will be described in the environment of an aircraft for use by workers who are cleaning the fuel tanks located within the wings and tail section of the aircraft, it should be understood that the system will work equally well in any situation in which workers perform individually within a confined hazardous area remote from other workers.

Figure 1:
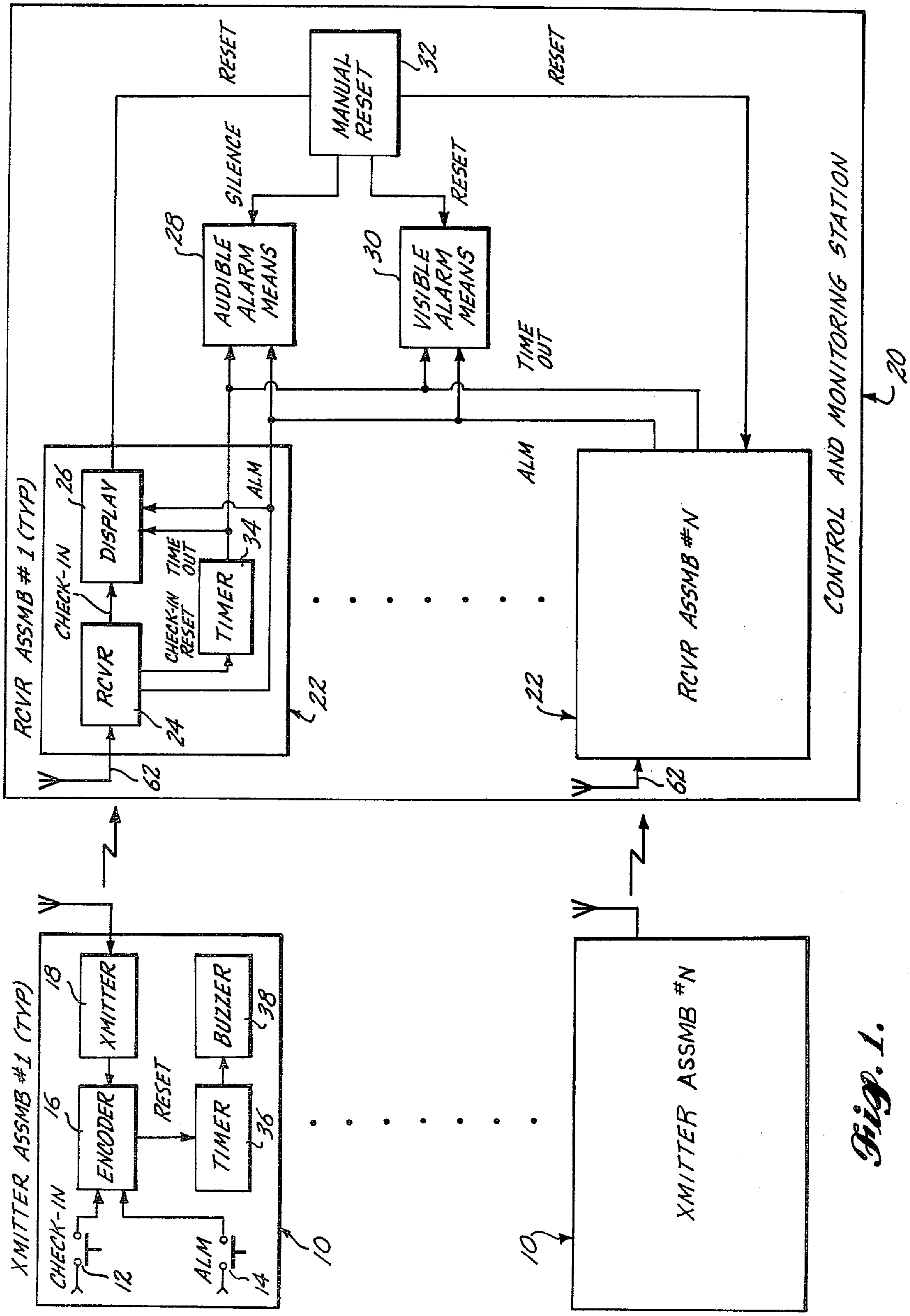
FIG. 1 is a functional block diagram of the communications system of the present invention.

Referring to FIG. 1, a communications system made according to the principles of the present invention includes a plurality of transmitter assemblies, one assigned to each of the hazardous work areas to be monitored. A typical transmitter assembly 10 includes a manually actuatable check-in button 12 and a manually actuatable alarm button 14 coupled to an encoder 16 that develops a signal in response to actuation of either the check-in or alarm button, and encodes on the signal information that indicates whether the check-in button or alarm button has been pressed. The encoder 16 is coupled to a transmitter 18 which sends the encoded signal to a centrally located control and monitoring station 20. The control and monitoring station 20 includes a plurality of receiver assemblies with a discrete receiver assembly matched to each transmitter assembly. A typical receiver assembly 22 matched to the transmitter assembly 10 includes a receiver 24 that receives the message signal transmitted by the transmitter 18 and decodes it to determine whether the signal was initiated by depression of the check-in button 12 or the alarm button 14. If the signal is one indicating that the check-in button was pressed and that the worker is in good condition, a check-in signal is sent by the receiver 24 to a display assembly 26 to light a green light or other suitable indicator to indicate that the worker has checked in and is okay. If the signal received by the receiver is one initiated by depression of the alarm button 14, then the receiver 24 sends an alarm signal to the display unit 26 that lights a red light or other suitable indicator on the display unit indicating an alarm condition. In the case of an alarm, the receiver 24 also sends an alarm signal to an audible alarm means 28 and a visible alarm means 30 associated with the control and monitoring station 20 and preferably common to all of the receiver assemblies. A manually actuatable reset assembly 32 is included in the control and monitoring station and is coupled to the audible alarm means and visible alarm means so that in one instance the reset assembly can be actuated to send a silence signal to the audible alarm means to silence the audible alarm while the visible alarm means continues to indicate, so that later occurring alarms from other transmitter assemblies in other work locations are not masked by the first alarm that is received. The reset assembly 32 can also be actuated to send a reset signal to both the visible alarm means and the receiver assembly 22 to remove all alarm indications when the problem that necessitated transmitting the alarm signal has been corrected.

The receiver assembly 22 also includes a first timer 34 coupled to both the receiver 24 and the display assembly 26. The first timer 34 is initialized by an initialization signal produced by the receiver 24 upon reception of a check-in signal from the transmitter 18. The first timer then monitors a predetermined time period, in the preferred embodiment 30 minutes. Upon expiration of the 30 minutes from the initialization the first timer sends a time out signal to the display unit 26 to light an amber light or other suitable indicator signifying that a check-in signal has not been received within the last 30 minutes. The first timer at the same time also sends a time out signal to the visible alarm means and the audible alarm means, actuating those two alarm systems in the same manner that they are actuated by the alarm signal from the receiver 24. The first timer and alarm subsystem insures that should anything happen to the worker in the remote hazardous location that prevents him from operating the alarm button on the transmitter assembly, that a time period no longer than the time set by the timer, for example, 30 minutes, goes by without notification to the monitoring personnel that some trouble has occurred.

In order to prevent false alarms caused simply by forgetfulness on the part of the worker in failing to send a check-in signal at the required intervals to prevent an alarm from occurring, the transmitter assembly 10 is equipped with its own second timer 36 that is initialized in response to depression of the check-in button 12 and that is set for a time period shorter than the time set in the receiver assembly's first timer 34, for example 25 minutes. The second timer 36 in the transmitter assembly 10 is coupled to an attention-getting device, for example, a buzzer 38 included in the transmitter assembly. Upon expiration of the time period set in the second timer 36, the second timer 36 sends a signal to the buzzer 38 causing the buzzer to sound, thereby alerting the worker that it is time to check in. Upon depression of the check-in button 12, the second timer 36 is reset and the buzzer 38 is deactivated for another predetermined length of time.

In the preferred embodiment the signal sent from the transmitter 18 to the receiver 24 is an RF signal and the "check-in" or "alarm" condition is digitally encoded on the RF carrier. While the preferred embodiment uses RF signals, it would also be possible to use ultrasonic or other types of carrier signals with proper equipment to encode the necessary information onto the carrier. Further, while the RF signal in the preferred embodiment is digitally encoded with the message information, any other type of modulation which would achieve similar encoding could be used, such as frequency modulation of a carrier signal.

Figure 2:
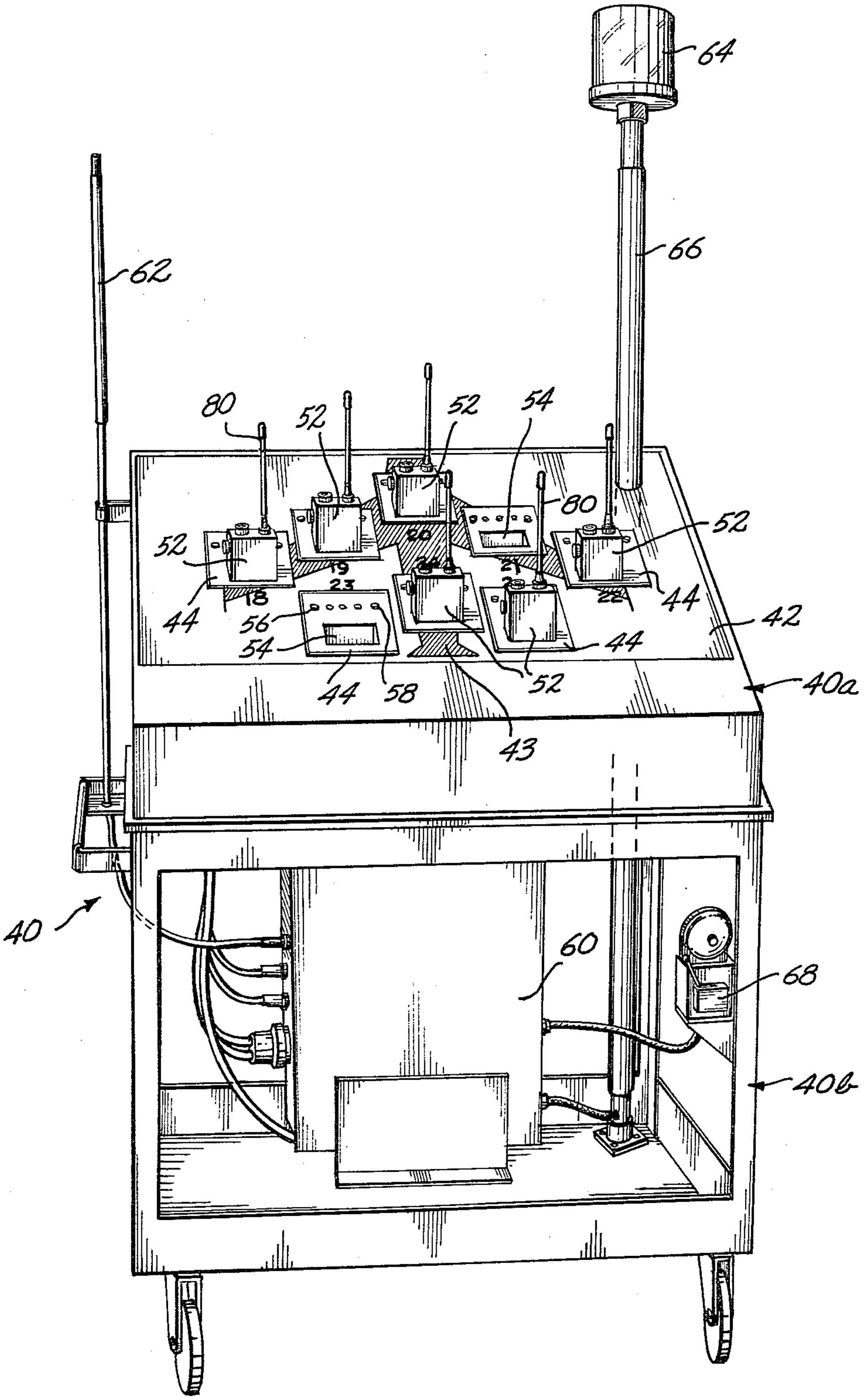
FIG. 2 is an isometric view of a receiver control and monitoring station suitable for use in the communications system of the present invention.

FIGS. 2, 3, 4 and 5 illustrate one structural embodiment of the communication system functionally depicted in FIG. 1. Referring now to FIGS. 2, 3 and 4 a control console 40 includes an upper portion 40*a* and a lower portion 40*b* and houses the control and monitoring station. A control panel 42 forms the upper wall of the upper portion 40*a* of the control console. The control panel 42 has a plan view outline of an aircraft 43 depicted thereon. The control panel could alternatively have other pictures or no picture depicted thereon, depending on the environment in which the communications system was being used. In the illustrated embodiment, for use in an aircraft environment, a plurality of receptacle and indicator units 44 are mounted on the panel 42 arranged at each location of a hazardous work area, for example, on the wings and fuselage of the aircraft. Each receptacle and indicator unit includes an indicator light group including a red indicator light 46, a yellow indicator light 48 and a green indicator light 50. The receptacle and indicator assembly 44 is shown in detail in FIG. 4. The red light 46 has the legend "ALARM" printed above it. The green light 50 has the legend "CHECKED" marked above it and the yellow light 48 has the legend "WARNING" marked above it.

A rectangular aperture is formed in each receptacle and indicator assembly 44 to accommodate entry of a transmitter unit 52 into transmitter receptacles 54 one of which is mounted in register with each aperture in each receptacle and indicator unit extending downwardly from the control panel 42. Each receptacle and indicator unit also includes an audio silence switch 56 and an alarm reset switch 58 mounted adjacent the indicator lights. The function of theswitches 56 and 58 will be described below.

The receiver assembly electronics are housed in an electronics cabinet 60 mounted in the lower section 40*b* of the control console and coupled to the control panel ... dicator lights by suitable cables. A common antenna 62 is mounted on the upper portion 40*a* of the control console and extends upwardly above the console. The antenna is simultaneously coupled to all of the receivers. In the illustrated embodiment each of the receivers comprises a printed circuit board (not shown) mounted within the electronics cabinet 60. The signal received by the antenna 62 is routed to all the receiver circuit boards simultaneously. The signal from each transmitter is coded to identify it as originating from a particular transmitter. Therefore, although all the receiver boards receive the signal, only that one receiver board that is keyed to the particular coded signal from a specific transmitter is actuated by the signal.

Alternatively, a single receiver circuit could be used that is coupled to a plurality of display units. In this form, the signal from the transmitter would necessarily be encoded with transmitter-identifying information. The single receiver circuit would be capable of decoding the signal to determine which transmitter was sending the signal. Upon identifying the transmitter, the receiver would then activate the display unit associated with that particular transmitter and work station.

A strobe light 64 preferably of either red or yellow color performs the visible alarm function and is mounted on one end of a rod 66 which in turn is attached at its other end to the lower section of the control console 40. The strobe light 64 provides a visual indication of an alarm condition in which help is sent to the worker at the hazardous working location and is coupled to the receiver electronics by a suitable cable. Preferably the rod 66 is long enough to place the strobe light 64 some distance above the console at a height that makes it easily visible not only from the area immediately adjacent the control console, but also from an area out to a substantial perimeter surrounding the control console. The audible alarm function is performed by a bell 68 or other suitable audible signal-producing means mounted on a side panel of the lower section of the control console and also coupled to the receiver electronics by a suitable cable.

A typical transmitter unit 52 is shown in FIG. 5 and preferably comprises case 70 of a size comparable to a standard walkie-talkie easily held by a person or clipped to the belt without an excess amount of weight having to be carried around with the worker while performing his job function. A check-in button 72 is mounted on the top of the transmitter unit and is recessed within a cylindrical guard 74 to prevent accidental actuation of the check-in button. An alarm button 76 is mounted on a side panel of the transmitter unit and is recessed within a cylindrical guard 78 similar to the guard 74 surrounding the check-in button. A conventional antenna 80 is mounted on the top panel adjacent the check-in button 72 and extends outwardly from the transmitter unit 52.

For purposes of system integrity, it is preferable that the control console contain a battery charging system which acts to maintain a full charge on the batteries of the transmitter when the transmitter is placed into its storage receptacle in the control console. Similarly, to prevent unnecessary or false alarms and to also prevent unnecessary current drain from the battery, circuits are provided to disable the transmitter timer and buzzer when the transmitter is located in its receptacle. A four-pin male electrical connector 82 is located at the bottom of the transmitter unit. The four-pin male connector mates with a four-pin female electrical connector 84 mounted at the bottom of the transmitter receptacle 54 mounted in the control console 40. Two of the male pin connectors are connected internally within the transmitter unit so as to connect the battery within the transmitter unit to a battery charger within the receiver electronics cabinet when the transmitter unit is mounted in its associated receptacle during periods of nonuse. The other two pins of the male connector cooperate with the matching pins of the female connector to form a circuit to disable the reminder buzzer 38 and second timer 36 located within the transmitter unit case in a conventional manner.

The audio silence switch 56 labelled "AUDIO RESET" in FIG. 4 is coupled to the bell 68 on the receiver console in such a manner that by positioning the audio silence switch to the correct position the bell is prevented from ringing for that particular receiver/transmitter pair. It is used to silence the alarm to allow the remaining work areas to be monitored by the audible alarm circuitry while help is being sent to the individual work area transmitting the alarm. The bell silence mechanism is necessary so that the first alarm generated by a particular transmitter/receiver pair does not mask later alarms generated by other transmitter/receiver pairs. The alarm reset switch 58 on each receptacle and indicator panel is coupled to the strobe light and is used to reset the alarms and to turn off the strobe light and the red light on the display panel when the situation that necessitated the alarm has been cleared.

In operation, the control console 40 is set up in the general area of a work station, for example, near an airplane under construction. The transmitter units 52 are mounted in the receptacles 54 within the receiver console during periods of nonuse. When a worker is to perform some task within one of the designated hazardous work areas he first reports to the control console and removes the transmitter unit assigned to the work area in which he is to be deployed, for example, in the illustrated embodiment if the worker is going to be working within the right hand wing of the aircraft he removes the transmitter unit that is in the receptacle associated with the right hand wing on the plan view outline of the airplane present on the control console panel. The worker then presses the alarm button 76 to insure that the alarm is working and activates both the visible and audible alarms on the control console as well as lighting the red light on the receptacle and indicator assembly associated with the transmitter unit that he has removed. If the alarm appears to be working satisfactorily, the worker silences the alarm, sets the reset button, and then presses the check-in button 72 on the transmitter unit to provide a green light at the receptacle and indicator assembly and to initialize the receiver first timer and transmitter second timer to begin operation. The worker then takes the transmitter unit with him to the designated work area. After a predetermined amount of time the transmitter unit second timer will run out and cause the transmitter unit buzzer to sound alerting the worker that he must check in. The worker then presses the check-in button and reinitializes both timers. Should the worker experience some difficulty while in the hazardous working area, for example a feeling of faintness or dizziness, he can press the alarm button on the transmitter unit thereby actuating the audible and visible alarms at the control console 40 and also causing a red light to be displayed on the receptacle and indicator assembly associated with his particular location on the console panel display. The monitoring personnel are then alerted that aid is required in his work station. Should the worker become faint and lose consciousness or in some other way become incapacitated so that he cannot press the alarm button or the check-in button, then upon expiration of the time period set into the first timer in the receiver the first timer will send a time out signal lighting the amber light on the receptacle and indicator assembly associated with his work location and again actuating the audible and visible alarms on the control console. This indicates to the monitoring personnel that for some reason a predetermined period of time has elapsed without a check-in by the worker and the monitoring personnel can dispatch aid to the worker's work station immediately to investigate the problem.

For use in environments where the atmosphere may contain potentially explosive gases it is necessary the transmitter assembly be intrinsically safe, that is, that the amount of current generated within the transmitter should be of such a low magnitude that it would not set off an explosion due to sparking. Further it is desirable that the transmitter operating temperature remains rather low, both for personal safety of the user and for the prevention of explosive conditions. In order to insure proper operation of the transmitter during an entire working shift, it is preferable that the transmitter batteries have a life of approximately 16 hours or two working shifts to provide a sizable safety margin should the batteries be out of their charging receptacle for a long period of time. It will be apparent to those of ordinary skill in the art that many changes can be made to the illustrated and described embodiments of the present invention and equivalent means substituted for certain components specifically named while remaining within the spirit and scope of the invention. Therefore, the scope of the invention should be determined solely by reference to the claims that follow.

The embodiments of the invention in which a property or privilege is claimed are as follows:

1. A communication system for use in a confined hazardous area comprising:

- a transmitter for selectively transmitting a first signal and a second signal;
- a first manually actuatable means associated with said transmitter operable to initiate transmission of said first signal;
- a second manually actuatable means associated with said transmitter operable to initiate transmission of said second signal;
- first timing means associated with said transmitter and coupled to said first manually actuatable means, said first timing means being initialized by operation of said first manually actuatable means and producing an alert signal upon expiration of a first predetermined time period after initialization;
- alert means associated with said transmitter and coupled to said first timing means, said alert means producing a humanly perceptible reminder signal in response to said alert signal;
- receiving means for receiving said first and second signals;
- first alarm means associated with said receiving means for producing a humanly perceptible first alarm signal in response to reception of said second signal;
- second timing means associated with said receiving means, said second timing means being initialized in response to reception of said first signal and producing a time-out signal upon expiration of a second predetermined time period after initialization if said timer means is not initialized again during said second predetermined time period;
- second alarm means associated with said receiver and said second timing means for producing a humanly perceptible second alarm signal in response to said time-out signal.

2. The communications system of claim 1 wherein said alert means comprises a buzzer.

3. The communications system of claim 1 wherein said transmitter includes an RF transmitter for transmitting a radio frequency signal, and

- encoder means coupled to said RF transmitter and to said first and second manually actuatable means, said encoder acting in response to actuation of said first and second manually actuatable means to encode information on the RF signal produced by said RF transmitter to produce said first signal and said second signal.

4. The communications system of claim 3 wherein said encoder means digitally encodes the information on said RF signal.

5. The communication system of claim 1 wherein said first predetermined time period is shorter than said second predetermined time period.

6. The communication system of claim 1 wherein said first and second alarm means produce a visible signal and further including a third alarm means associated with said receiver means for producing an audible third alarm signal in response to either reception of said second signal or production of said time-out signal, said audible third alarm signal being produced in conjunction with said humanly perceptible first or second alarm signals.

7. The communication system of claim 6 further including a first reset means manually operable to cease production of said audible third alarm signal while maintaining production of said first or second alarm signal.

8. The communication system of claim 7 further including a second reset means manually operable to cease production of said first and second alarm signal.

9. A communication system for use in a confined hazardous area comprising:

a plurality of transmitters, each transmitter capable of transmitting an alarm signal and a check-in signal, the signals from each transmitter being identified with that transmitter;

first manually actuatable means associated with each of said transmitters and operable to initiate transmission of said alarm signal;

second manually actuatable means associated with each of said transmitters and operable to initiate transmission of said check-in signal;

first timer means mounted on each of said transmitters and coupled to said second manually actuatable means, said first timer means being initialized by operation of said second manually actuatable means, said first timer means producing a first time-out signal upon expiration of a first predetermined period of time after initialization;

alert means mounted on each of said transmitters and coupled to said first timer means to produce a humanly perceptible alert signal in response to said first time-out signal;

a monitoring station including a plurality of receiver means constructed to be in matched relationship to said transmitters, each of said receiver means being operable to produce a second alarm signal upon reception of said first alarm signal from its associated transmitter and an initialization signal upon reception of a check-in signal from its associated transmitter, said receiver means producing no signal in response to signals transmitted by other than its associated transmitter;

a plurality of second timer means, each of said second timer means being associated with one of said receiver means, said second timer means being initialized in response to said initialization signal produced by its associated receiving means and each of said second timer means producing a second time-out signal upon the expiration of a second predetermined period of time after initialization;

general alarm signal means associated with said monitoring station and coupled to all of said timer means and to all of said receiver means, said general alarm signal means producing a humanly perceptible general alarm signal in response to reception of said time-out signal from any of said timer means or said second alarm signal from any of said receiver means;

a plurality of indicator assemblies, each indicator assembly associated with one of said receiver means, each of said indicator assemblies including a first indicator means operable in response to a second alarm signal from its associated receiving means to produce a first humanly perceptible signal, a second indicator means operable in response to a second time-out signal from its associated timer means to produce a second humanly perceptible signal and a third indicator means operable in response to said initializing signal from its associated receiving means to produce a third humanly perceptible signal.

10. The communication system of claim 9 further including reset means associated with said monitoring station and manually operable to disable said general alarm signal means while having no effect on said first, second and third indicator means.

11. The communication system of claim 9 wherein said first predetermined period of time is shorter than said second predetermined period of time.

* * * * *